United States Patent
Urabe et al.

(10) Patent No.: US 7,247,666 B2
(45) Date of Patent: Jul. 24, 2007

(54) FLAME RETARDANT RESIN COMPOSITION

(75) Inventors: Hiroshi Urabe, Hiratsuka (JP); Hajime Ohyama, Hiratsuka (JP); Masami Suzuki, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 0 days.

(21) Appl. No.: 09/870,716

(22) Filed: May 30, 2001

(65) Prior Publication Data
US 2002/0198295 A1    Dec. 26, 2002

(30) Foreign Application Priority Data
May 29, 2000    (JP)    ............................. 2000-157913
Jun. 30, 2000    (JP)    ............................. 2000-198011

(51) Int. Cl.
*C08K 5/49*    (2006.01)
*C08K 5/5399*    (2006.01)

(52) U.S. Cl. ..................................... 524/116
(58) Field of Classification Search ................ 524/116
See application file for complete search history.

(56) References Cited

U.S. PATENT DOCUMENTS 4,094,856 A    6/1978   Guschl
4,806,602 A *  2/1989   White et al. ............. 525/397
5,028,347 A *  7/1991   An et al. ................. 252/62.54
6,337,031 B1 * 1/2002   Ida et al. ................. 252/62.54

FOREIGN PATENT DOCUMENTS

| EP | 0945478 | * | 9/1999 |
| JP | 49-108146 | | 9/1974 |
| JP | 9071708 A | | 3/1997 |
| JP | 11181429 A | | 7/1999 |
| WO | PCT/JP99/04256 | | 8/1999 |

OTHER PUBLICATIONS

European Search Report dated Sep. 12, 2001 for Application No. eP 01 11 2076.

* cited by examiner

*Primary Examiner*—Nathan M. Nutter
(74) *Attorney, Agent, or Firm*—Edwards Angell Palmer & Dodge LLP; David G. Conlin; Mark D. Russett

(57) ABSTRACT

The present invention relates to a flame retardant resin composition comprising:
 100 parts by weight of a thermoplastic polyamide resin (A),
 1 to 100 parts by weight of a phosphazene compound (C), and
 a polyphenylene ether-based resin, a polystyrene-based resin or mixture thereof (B) being present in an amount of 10 to 500% by weight based on the weight of said phosphazene compound (C).

18 Claims, No Drawings

FLAME RETARDANT RESIN COMPOSITION

BACKGROUND OF THE INVENTION

The present invention relates to a flame retardant resin composition, and more particularly, it relates to a flame retardant polyamide resin composition which are excellent in flame retardant property, mechanical properties and heat resistance, and free from bleed-out of flame retarder and mold deposits.

Flame retardant polyamide resins reinforced by adding inorganic filler thereto have been extensively used in electric parts such as power breakers, electromagnetic switches, wiring connectors and electric tools because of excellent mechanical properties thereof.

As the reinforced flame retardant polyamide resins, there have been proposed compositions prepared by blending a flame retarder such as halogen compounds, red phosphorus and magnesium hydroxide in the polyamide resin as starting material. A part of these resins have been already put into practice. However, the compositions prepared by blending halogen compounds in the polyamide resin, tend to generate corrosive decomposition gases upon molding, resulting in corrosion of molding machine or mold, or tend to cause environmental pollution due to generation of harmful gases upon incineration thereof. Also, the compositions prepared by blending magnesium hydroxide in the polyamide resin are insufficient in mechanical properties because a large amount of magnesium hydroxide must be added thereto. In addition, the compositions prepared by blending red phosphorus in the polyamide resin tend to generate harmful gases upon molding. Thus, any of the conventional polyamide resin compositions has problems upon practical use.

As flame retardant polyamide resins which are free from the above problems, there have been proposed resin compositions prepared by blending a phosphazene compound as flame retarder in the polyamide resin as starting material (refer to Japanese Patent Application Laid-Open (KOKAI) No. 51-34946). However, according to experiments made by the present inventors, it has been found that the phosphazene compound has a poor compatibility with aliphatic polyamide resins and, therefore, suffers from remarkable bleed-out.

Resin magnets prepared by blending a magnetic powder as inorganic filler in a thermoplastic resin as binder are excellent in moldability, mechanical properties and magnetic properties and, therefore, have been widely used in various applications such as motors, audio devices, OA devices, electric or electronic parts or the like. In recent years, these resin magnets have been required to show a flame retardant property for ensuring high safety.

As the thermoplastic resins presently used in the resin magnets, polyamide resins have been most extensively used because of excellent moldability, magnetic properties, mechanical properties and so on. In particular, polyamide 6 has been preferably used for this purpose. However, since the polyamide resins themselves are combustible, the addition of a flame retarder is required for imparting a flame retardant property thereto. Hitherto, as such flame retarders used for imparting a flame retardant property to the polyamide resins, there have been extensively used halogen-based flame retarders containing halogens such as bromine and chlorine. The use of the halogen-based flame retarders, however, not only causes corrosion of molding machines or molds due to generation of corrosive gases upon molding, but also generates harmful substances such as dioxin which cause environmental pollution, upon disposal and incineration of molded products containing the flame retarder.

As a result of the present inventors' earnest studies to solve the above problems, it has been found that these problems can be eliminated by using a polyamide resin composition prepared by blending a specific amount of polyphenylene ether-based resin and/or polystyrene-based resin in a polyamide resin composition containing a phosphazene compound as flame retarder. The present invention has been attained on the basis of the finding.

SUMMARY OF THE INVENTION

An object of the present invention is to provide a flame retardant resin composition (especially flame retardant polyamide resin composition) which is free from problems such as corrosion of molding machines due to flame retarder, bleed-out thereof and mold deposits, and is excellent in flame retardant property, mechanical properties and heat resistance.

To attain the above aim, in the first aspect of the present invention, there is provided a flame retardant resin composition comprising:

100 parts by weight of a thermoplastic polyamide resin (A), 1 to 100 parts by weight of a phosphazene compound (C), and a polyphenylene ether-based resin, a polystyrene-based resin or mixture thereof (B) being present in an amount of 10 to 500% by weight based on the weight of said phosphazene compound (C).

In the second aspect of the present invention, there is provided a flame retardant resin composition comprising:

100 parts by weight of a thermoplastic polyamide resin (A), 1 to 100 parts by weight of a phosphazene compound (C), a polyphenylene ether-based resin, a polystyrene-based resin or mixture thereof (B) being present in an amount of 10 to 500% by weight based on the weight of said phosphazene compound (C), and an inorganic filler (D1).

In the third aspect of the present invention, there is provided a flame retardant resin composition comprising:

100 parts by weight of a thermoplastic polyamide resin (A), 1 to 100 parts by weight of a phosphazene compound (C), a polyphenylene ether-based resin, a polystyrene-based resin or mixture thereof (B) being present in an amount of 10 to 500% by weight based on the weight of said phosphazene compound (C), and a magnetic powder (D2).

DETAILED DESCRIPTION OF THE INVENTION

The present invention will be described in detail below.

The flame retardant resin composition (especially flame retardant polyamide resin composition) of the present invention comprises a polyamide resin composition comprising a thermoplastic polyamide resin (A) and a phosphazene compound (C), and a polyphenylene ether-based resin or a polystyrene-based resin (B) blended in the polyamide resin composition.

As the thermoplastic polyamide resin (A) (hereinafter occasionally referred to merely as "component (A)"), there may be used polyamides obtained by polycondensation of lactams having 3 or more-membered ring or polymerizable ω-amino acids, or polycondensation between dibasic acids and diamines. Examples of the polyamides may include polymers of ε-caprolactam, aminocaproic acid, enantholactam, 7-aminoheptanoic acid, 11-aminoundecanoic acid, 9-aminononanoic acid, α-pyridine, α-piperidone or the like; polymers produced by the polycondensation between diamines such as hexamethylenediamine, nonamethylenediamine, undecamethylenediamine, dodecamethylenediamine and m-xylylenediamine, and dicarboxylic acids such as terephthalic acid, isophthalic acid, adipic acid, sebacic acid, dodecanedioic acid and glutaric acid; or copolymers thereof.

Specific examples of the polyamides may include polyamides 4, 6, 7, 8, 11, 12, 6.6, 6.9, 6.10, 6.11, 6.12, 6T, 6/6.6, 6/12, 6/6T and 6I/6T or the like. Among these polyamides, polyamide 6, polyamide 6.6 and copolyamide 6/66. These polyamides may be used alone or in combination of any two or more thereof.

The polyamide resin (A) preferably has a specific polymerization degree, i.e., a specific relative viscosity. More specifically, the relative viscosity of the polyamide resin (A) is usually 2.0 to 5.0, preferably 2.2 to 4.0 when measured at a concentration of 1% in 98% sulfuric acid at 25° C. according to JIS K 6810. When the relative viscosity is too low, the polyamide shows a poor strength. When the relative viscosity is too high, the polyamide is deteriorated in fluidity and moldability, resulting in poor appearance of molded products produced therefrom.

The phosphazene compound (C) of the present invention (hereinafter occasionally referred to merely "component (C)") is at least one compound selected from the group consisting of cyclic phenoxy phosphazenes represented by the following general formula [I]:

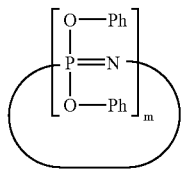

wherein m is an integer of 3 to 25; and Ph is phenyl, chain phenoxy phosphazenes represented be the following general formula [II]:

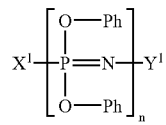

wherein $X^1$ is —N=P(OPh)$_3$ or —N=P(O)OPh; $Y^1$ is —P(OPh)$_4$ or —P(O)OPh$_2$; n is an integer of 3 to 10,000; and Ph is phenyl, and cross-linked phenoxy phosphazene compounds obtained by cross-linking at least one phenoxy phosphazene selected from the group consisting of those represented by the general formulae [I] and [II], through a cross-linking group.

As the preferred cross-linking groups used in the cross-linked phenoxy phosphazene compounds, there may be exemplified phenylene groups and bisphenylene groups. Of these cross-linking groups, more preferred is at least one group selected from the group consisting of o-phenylene, m-phenylene, p-phenylene and bisphenylene groups represented by the following general formula [III]:

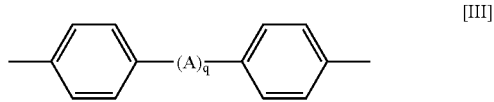

wherein A is —C(CH$_3$)$_2$—, —SO$_2$—, —S— or —O—; and q is 0 or 1.

In the cross-linked phenoxy phosphazene compounds, it is especially preferred that the cross-linking group thereof is present between two oxygen atoms of the phosphazene compounds from which phenyl groups are eliminated; the content of phenylene groups derived from those represented by the general formula [III] is 50 to 99.9 mol % based on the total number of phenyl groups and phenylene groups contained in the cyclic phenoxy phosphazene represented by the general formula [I] and/or the chain phenoxy phosphazene represented by the general formula [II]; and no free hydroxy groups are present in the phosphazene compound (C).

Examples of the cyclic phenoxy phosphazene compounds represented by the general formula [I] and the chain phenoxy phosphazene compounds represented by the general formula [II] may include (1) phosphazene compounds obtained by substituting chlorine atoms of a mixture of cyclic and straight-chain chlorophosphazenes such as hexachlorocyclotriphosphazene and octachlorocyclotetraphosphazene which are produced by reacting ammonium chloride with phosphorus pentachloride, with phenoxy and/or alkoxy groups; and (2) cyclic phosphazene compounds such as phenoxycyclotriphosphazene, octaphenoxycyclotetraphosphazene, decaphenoxvcyclopentaphosohazene, hexaalkoxycyclotriphosphazene, octaalkoxytetraphosphazene and decaalkoxycyclopentaphosphazene which are produced by removing single substances from the above mixture of chlorophosphazenes, and then substituting chlorine atoms thereof with phenoxy and/or alkoxy groups.

As the chain phenoxy phosphazene compounds represented by the general formula [II], there may be exemplified such phosphazene compounds produced by first subjecting hexachlorocyclotriphosphazene to ring-opening polymerization at a temperature of 220 to 250° C., and then substituting chlorine atoms of the obtained straight-chain dichlorophosphazene having a polymerization degree of 3 to 10,000 with phenoxy and/or alkoxy groups.

As the cross-linked phosphazene compounds containing the cross-linking group represented by the general formula [III], there may be exemplified phenoxy phosphazenes which have a cross-linking structure containing 4,4'-sulfonyldiphenylene (bisphenol S residue); phenoxy phosphazenes which have a cross-linking structure containing 2,2-(4,4'-diphenylene)isopropylidne group; phenoxy phosphazenes which have a cross-linking structure containing 4,4'-oxydiphenylene group; phenoxy phosphazenes which have a cross-linking structure containing 4,4'-thiodiphenylene group; phenoxy phosphazenes which have a cross-linking structure containing 4,4-diphenylene group; or the like. The content of the phenylene groups in the cross-linked phenoxy phosphazene is 50 to 99.9 mol %, preferably 70 to 90 mol % based on the total number of phenyl groups and phenylene groups contained in the cyclic phenoxy phosphazene compound represented by the general formula [I]

and/or the chain phenoxy phosphazene compound represented by the general formula [II].

Among the cyclic phenoxy phosphazene compounds represented by the general formula [I], preferred are those compounds wherein m is in the range of 3 to 8. Among the straight-chain phenoxy phosphazene compounds represented by the general formula [II], preferred are those compounds wherein n is in the range of 3 to 25. Among the cross-linking groups represented by the general formula [III], preferred are those groups wherein A is, —$SO_2$—, —S— or —$C(CH_3)_2$—.

The cyclic phenoxy phosphazene compound represented by the general formula [I] and the chain phenoxy phosphazene compound represented by the general formula [II] may be produced, for example, by the methods described in H. R. Allocook, "Phosphorus-Nitrogen Compounds", Academic Press (1972), and J. E. Mark, H. R. Allcook and R. West, "Inorganic Polymers", Prentice-Hall International, Inc. (1992).

In the flame retardant resin composition of the present invention, the phosphazene compound (C) is contained in an amount of 1 to 100 parts by weight, preferably 5 to 90 parts by weight, more preferably 10 to 80 parts by weight based on 100 parts by weight of the polyamide resin (A). When the content of the phosphazene compound (C) is less than 1 part by weight, the obtained polyamide resin composition is insufficient in flame retardant property. When the content of the phosphazene compound (C) is more than 100 parts by weight, the obtained polyamide resin composition is deteriorated in mechanical properties.

The flame retardant resin composition of the present invention is free from the generation of harmful gas or smoke such as hydrogen halide upon decomposition or combustion thereof because the phosphazene compound (C) contains no halogen atoms. In addition, when the flame retardant resin composition is formed (molded) into various products, cylinder and screw of molding machine and mold can be prevented from being corroded.

The flame retardant resin composition of the present invention may further contain an inorganic filler (D1) (hereinafter occasionally referred to merely as "component (D1)") in order to enhance strength and stiffness of the composition. Examples of the inorganic filler (D1) may include those ordinarily used for reinforcing thermoplastic resins. Specific examples of the inorganic filler (D1) may include glass fibers, carbon fibers, glass flakes, glass beads, mica, talc, kaolin, wollastonite, potassium titanate whiskers, aluminum borate whiskers, barium sulfate, ferrite, swellable mica, calcium carbonate or the like. These inorganic fillers may be used alone or in combination of any two or more thereof. Among these inorganic fillers, glass fibers are preferred. The glass fibers may be those ordinarily used as reinforcing materials for thermoplastic resins, and especially preferred glass fibers are chopped strands formed from E glass (alkali-free glass) The glass fibers usable in the present invention have a fiber diameter of usually 1 to 20 μm, preferably 5 to 15 μm. Also, the glass fibers may be surface-treated with a silane-based coupling agent in order to enhance adhesion to the polyamide resin.

In the flame retardant resin composition of the present invention, the content of the inorganic filler (D1) is 5 to 300 parts by weight, preferably 10 to 200 parts by weight, more preferably 20 to 120 parts by weight based on 100 parts by weight of the thermoplastic polyamide resin (A). When the content of the inorganic filler (D1) is less than 5 parts by weight, the obtained composition may not be sufficiently improved in strength and stiffness. When the content of the inorganic filler (D1) is more than 300 parts by weight, the obtained molded products may be deteriorated in appearance.

The flame retardant resin composition of the present invention may be blended with a magnetic powder (D2) to impart magnetic properties thereto. Such a composition can be used as a composition for production of flame retardant resin magnets. Namely, a flame retardant resin magnet can be produced by molding the above composition. The magnetic powder (D2) used in the present invention are not particularly restricted, and any magnetic powders are usable as long as the powders have suitable magnetic properties. Examples of the magnetic powder (D2) may include ferrite-based magnetic powders, alnico-based magnetic powders, rare earth magnetic powders or the like. As the ferrite-based magnetic powders, there may be exemplified barium ferrite-based magnetic powders produced from iron oxide, barium carbonate, etc., strontium ferrite-based magnetic powders produced from strontium carbonate, etc., or the like. As the alnico-based magnetic powders, there may he exemplified alnico-5 containing nickel, aluminum, cobalt and copper, alnico-7 containing nickel, aluminum, cobalt, copper and titanium, or the like. As the rare earth magnetic powders, there may be exemplified samarium-cobalt, rare earth-cobalt magnets obtained by substituting cobalt of samarium-cobalt alloy with copper, iron, titanium, zirconium, hafnium, niobium or tantrum, neodymium-iron-boron magnets or the like. These magnetic powders may be used alone or in combination of any two or more thereof.

The magnetic powder (D2) has an average particle size of usually not more than 300 μm, preferably not more than 200 μm, more preferably not more than 100 μm. When the average particle size of the magnetic powder is more than 300 μm, the obtained flame retardant resin magnet composition may be deteriorated in fluidity and mechanical strength. The magnetic powder may be surface-treated in order to improve the dispersibility and adhesion property when blended in the thermoplastic polyamide resin (A). The surface treatment of the magnetic powder may be conducted by treating the powder with various silane-based coupling agents or titanate-based coupling agents.

The content of the magnetic powder (D2) is usually 50 to 95% by weight, preferably 65 to 85% by weight based on the weight of the flame retardant resin composition from the standpoints of improved magnetic properties, moldability and mechanical properties of the obtained flame retardant resin magnet composition. When the content of the magnetic powder (D2) is too small, the flame retardant resin magnet composition may not show sufficient magnetic properties When the content of the magnetic powder is too large, the obtained flame retardant resin magnet composition may be deteriorated in moldability, and may fail to have a sufficient mechanical strength. When the magnetic powder (D2) is blended in the composition, the content of the phosphazene compound (C) is usually 0.1 to 40% by weight, preferably 1 to 10% by weight based on the weight of the flame retardant resin magnet composition. When the content of the phosphazene compound (C) is more than 40% by weight, the obtained flame retardant resin magnet composition tends to be deteriorated in mechanical strength. When the content of the phosphazene compound (C) is less than 0.1% by weight, the obtained Flame retardant resin magnet composition sometimes fails to show a sufficient flame retardant property.

The flame retardant resin composition of the present invention may contain the inorganic filler (D1) and the magnetic powder (D2) in combination.

The flame retardant resin composition of the present invention may further contain a polyphenylene ether-based resin and/or a polystyrene-based resin (B) (hereinafter occasionally referred to merely as "component (B)") in addition to the above components (A) and (C) and the optional component (D) By adding the component (B) to the composition, it becomes possible to enhance compatibility between the polyamide resin (A) and the phosphazene compound (C), and prevent the occurrence of sticky surfaces of pellets or molded products due to bleed-out of the phosphazene compound (C), or the occurrence of mold deposits.

As the polyphenylene ether-based resin, there may be exemplified polyphenylene ether, substituted polyphenylene ethers obtained by substituting hydrogen atoms of the phenylene group of the polyphenylene ether with suitable groups, and modified polyphenylene ethers. As the polystyrene-based resin, there may be exemplified polystyrene, substituted polystyrenes obtained by substituting hydrogen atoms of phenyl group of the polystyrene with suitable groups, rubber-modified polystyrenes (HIPS), AS resins, ABS resins or the like. In the present invention, a blended mixture of the polyphenylene ether-based resin and the polystyrene-based resin may also be used as the component (B). Specific examples of the blended mixture may include modified polyphenylene ethers obtained by blending polyphenylene ether with polystyrene, rubber-modified polystyrenes (HIPS) or the like. Among these resins, the polyphenylene ether-based resin is preferred.

In order to enhance the compatibility between the polyamide resin (A) and the polyphenylene ether-based resin and/or the polystyrene-based resin (B) and improve the mechanical properties of the obtained composition, the flame retardant resin composition of the present invention may further contain a compatibilizing agent, or the polyphenylene ether-based resin and/or the polystyrene-based resin (B) is modified with $\alpha,\beta$-unsaturated carboxylic acid.

In the flame retardant resin composition of the present invention, the content of the component (B) is 10 to 500% by weight, preferably 30 to 300% by weight, more preferably 50 to 200% by weight based on the weight of the phosphazene compound (C). When the content of the component (B) is less than 10% by weight based on the weight of the phosphazene compound (C), there arises problem of bleed-out of phosphazene compound (C). When the content of the component (B) is more than 500% by weight based on the weight of the phosphazene compound (C), there arises problem of deterioration of mechanical strength.

The flame retardant resin composition of the present invention may contain, if required, various additives such as other flame retarders, flame retardant assistants, mold-release agents, impact modifiers, heat stabilizers and colorants unless the addition thereof adversely affects the aimed effects of the present invention. Examples of the other flame retarders may include phosphorus compounds other than red phosphorus. Examples of the flame retardant assistants may include metal borates, metal hydrates such as magnesium hydroxide, metal oxide compounds such as magnesium oxide, molybdenum oxide, zinc oxide, iron oxide and copper oxide, nitrogen-containing compounds such as melamine, novolak phenols, PFFE (Teflon) or the like. Examples of the mold-release agents may include fatty acid amide compounds, fatty acid ester compounds, fatty acid metal salts or the like. Examples of the impact modifiers ray include various elastomers or the like Examples of the heat stabilizers may include copper compounds, phenol compounds or the like. Examples of the colorants may include carbon black or the like. These additives may be added to the composition at an optional stage from the production (polymerization) step of the starting resins to the molding step of the obtained composition, and are preferably added upon conducting a melt-kneading step using an extruder after mixing the starting resins with various other components.

The flame retardant resin composition of the present invention may be molded into aimed products by an ordinary molding method used for thermoplastic resins. Examples of the molding method may include injection-molding method, extrusion-molding method, blow-molding method, gas-assisted injection molding method, vacuum-molding method, compression molding method or the like. Kinds, shapes and sizes of the molded products are not particularly restricted as long as such products can be produced by the above molding method. The molded products obtained from the flame retardant resin composition may be suitably used in various industrial applications such as electric devices, electronic devices, telecommunication devices, building materials, automobiles, musical instruments, furniture or the like. Specific products obtained from the composition of the present invention may include, for example, electric parts such as power breakers, electromagnetic switches, wiring connectors and electric tools, business and OA devices such as printers, personal computers, word processors, key boards, telephones, facsimiles, electronic calculators, copiers, electronic cash registers (ECR), electronic notebooks and electronic dictionaries, domestic electric appliances such as TV, VTR, tape recorders, radio cassettes, CD players, mini-disks, refrigerators, freezers and electronic ranges, or the like.

Further, the magnet composition obtained by blending the magnetic powder as inorganic filler with the flame retardant resin composition of the present invention may be molded into magnetic products which are usable in many industrial applications, for example, motors, audio devices, OA devices and various electric and electronic parts. The shapes of these magnetic products are not particularly restricted, and the products may be of any desired shape such as discs, bars, pipes, boxes or the like. The flame retardant resin magnet composition of the present invention may be especially suitable for the production of such products which are required to function as a magnet.

The flame retardant resin composition of the present invention has various advantages, i.e., (1) exhibits a high flame retarding property, (2) contains no halogen-containing compounds nor red phosphorus and, therefore, is free from generation of corrosive gases as well as corrosion of cylinder and screw of molding machine and mold, and (3) is inhibited from suffering from bleed-out of the phosphazene compound as a flame retarder, and mold deposit phenomenon.

EXAMPLES

The present invention will be described in more detail by reference to the following examples. However, these examples are only illustrative and not intended to limit the present invention thereto.

Synthesis Example 1

Production of Phenoxy Phosphazene

A 1-liter four neck flask equipped with a stirrer, a thermometer and a reflux condenser was charged with 1.30 mol (123.0 g) of phenol and then with 500 milliliters (ml) of tetrahydrofuran (THF). The contents of the flask were stirred to form a uniform solution. While maintaining the solution at a temperature of not more than 25° C., 7.6 g of metal sodium was charged into the flask, and then the Aside temperature of the flask was increased up to 62° C. for one hour, thereby preparing a sodium phenolate solution. Separately, 290 g of a 20 wt. % chlorobenzene solution containing 0.5 unit mol (58 g) of a dichlorophosphazene oligomer (a mixture comprising 59% by weight of trimer, 12% by weight of tetramer, 11% by weight of pentamer and hexamer, 3% by weight of heptamer, and 15% by weight of octamer and higher oligomers) was charged into a 2-liter four neck flask. The previously prepared sodium phenolate solution was dropped into the chlorobenzene solution under stirring at a temperature of not more than 25° C. After completion of dropping, the contents of the flask were reacted with each other under stirring at a temperature of 71 to 73° C. for 15 hours.

After completion of the reaction, the obtained reaction mixture was concentrated, and then dissolved again in 500 ml of chlorobenzene. The resultant solution was washed with water, and then sequentially washed with a 5% sodium hydroxide aqueous solution three times, with a 5% sulfuric acid solution, and with a 5% sodium bicarbonate solution and water three times. The thus obtained solution was concentrated, and then dried and solidified to obtain 108 g of a light-yellow wax-like reaction product. The yield of the reaction product was 98.5%. The GPC analysis of the reaction product showed that the weight-average molecular weight (Mw) thereof was 810 calculated as polystyrene, and the amount of residual chlorine contained in the reaction product was 0.09%. Also, as a result of phosphorus and CHN elemental analysis, it was confirmed that the reaction product was a compound represented by a structural formula: $[N=P(-O-Ph)_{2.00}]$ wherein -Ph is phenyl (this definition is similarly applied to the below-mentioned cases).

Synthesis Example 2

Production of Phenoxy Phosphazene Compound Having a Cross-Linking Structure Containing P-Phenylene as Cross-Linking Group A 2-liter four neck flask was charged with 204 mol (196.0 g) of phenol, 2.04 mol (82 g) of sodium hydroxide and toluene. The contents of the flask were subjected to azeotropic dehydration, thereby preparing about 1,200 g of a 20% sodium phenolate toluene solution Separately, 580 g of a 20% chlorobenzene solution containing 1 unit mol (115.9 g) of a dichlorophosphazene oligomer (a mixture having the same composition as in Synthesis Example 1) was charged into a 2-liter four neck flask. While stirring the chlorobenzene solution, a separately prepared 10% toluene solution containing 0.15 mol (18.3 g) of a hydroquinone dilithium salt was dropped thereinto at a temperature of not more than 25° C. After completion of dropping, the resultant mixture was reacted under stirring at 50° C. for 5 hours. Successively, 1,200 g of the previously prepared 20% sodium phenolate toluene solution was dropped into the reaction solution, and the obtained mixture was reacted at 100° C. for 8 hours.

After completion of the reaction, the obtained reaction mixture was concentrated, and then added into 3 liters of a mixed solvent of water and methanol (volume ratio: 1/1) under stirring. The resultant solution was neutralized with a diluted sulfuric acid, and then filtered. Then, the obtained solids were washed with the mixed solvent of water and methanol (volume ratio: 1/1) two times, and then filtered. The obtained solids were dried at 80° C. for 11 hours, thereby obtaining 220 g of a little yellow powder. The yield of the reaction product was 99.7%. The GPO analysis of the reaction product showed that the weight-average molecular weight (Mw) thereof was 1,200 calculated as polystyrene, and the amount of residual chlorine contained in the reaction product was 0.01%. Also, as a result of phosphorus and CHN elemental analysis, it was confirmed that the reaction product was a compound represented by a structural formula: $[N=P(-O-Ph-O-)_{0.15}(-O-Ph)_{1.7}]$ wherein -Ph is phenyl.

Synthesis Example 3

Production of Phenoxy Phosphazene Compound Having a Cross-Linking Structure Containing 2,2-(4,4'-diphenylene)isopropylidne as Cross-Linking Group A 2-liter four neck flask was charged with 86.7 g (0.38 mol) of bisphenol A and 460 ml of THF. The contents of the flask were stirred and dissolved to prepare a uniform solution. While maintaining the temperature of the solution at 19° C., 3.5 g (0.5 gram equivalent) of sliced metal lithium was added into the solution. The solution was maintained at a temperature of 61 to 68° C. for one hour, thereby preparing a lithium salt of bisphenol A.

Separately, a 2-liter four neck flask was charged with 215.6 g (2.25 mol) of phenol and 500 ml of toluene. While maintaining the liquid temperature in the flask at 25° C. under stirring, 34.5 g (1.5 gram equivalent) of sliced metal sodium was charged into the flask. The inside temperature of the flask was increased up to 77° C. for 4 hours. The contents of the flask were continuously stirred at a temperature of 77 to 113° C. for 3 hours, thereby producing sodium phenolate.

Separately, 313.1 g (1.0 mol) of a dichlorophosphazene oligomer (a mixture having the same composition as used in Synthesis Example 1) was charged into a 5-liter four neck flask. While maintaining the liquid temperature in the flask at 20° C. under stirring, the previously prepared lithium salt of bisphenol A was dropped into the oligomer for one hour. Then, while maintaining the liquid temperature in the flask at 20° C. under stirring, the above prepared sodium phenolate was dropped thereinto for one hour. After completion of dropping, the resultant mixture was reacted under stirring at 47° C. for 13 hours.

After completion of the reaction, the obtained reaction mixture was concentrated, washed with a 2% sodium hydroxide aqueous solution three times, and then filtered. The mixture was further washed with 3 liters of a mixed solvent of water and methanol (volume ratio: 1/1) three times, and then filtered. The obtained filtrate was concentrated, and then dried at 80° C. for 11 hours, thereby obtaining 208.7 g of a white powder as a reaction product. The yield of the reaction product was 86.5%. The GPC analysis of the reaction product showed that the weight-average molecular weight (Mw) thereof was 1,190 calculated as polystyrene, and the amount of residual chlorine contained in the reaction product was 0.09%. Also, as a result of phosphorus and CHN elemental analysis, it was confirmed that the reaction product was a compound represented by a structural formula: $[N=P(-O-Ph-C(CH_3)_2-Ph-O-)_{0.25}(-O-Ph)_{1.50}]$

Synthesis Example 4

Production of Phenoxy Phosphazene Compound Having a Cross-Linking Structure Containing 4,4'-sulfonyldiphenylene (Bisphenol S Residue) as Cross-Linking Group A 1-liter four neck flask was charged with 1.25 mol (118.0 g) of phenol and 0.03 mol (8.3 g) of bisphenol S. The contents of the flask were reacted with each other in the same manner as in Synthesis Example 1, thereby obtaining a light yellow wax-like reaction product. The yield of the reaction product was 91.5%. The GPC analysis of the reaction product showed that the weight-average molecular weight (Mw) thereof was 820 calculated as polystyrene, and the amount of residual chlorine contained in the reaction product was not more than 0.01%. Also, as a result of phosphorus and CHN elemental analysis, it was confirmed that the reaction product was a compound represented by a structural formula: [N=P(—O-Ph-SO$_2$—Ph-O—)$_{0.05}$(—O-Ph)$_{1.90}$]

Starting materials used in the following Examples and Comparative Examples are shown below.

Polyamide-6 (1) (PA6):
NOVAMIDE 1010J (registered trademark; produced by Mitsubishi Engineering-Plastics Corporation; relative viscosity: 2.5)

Polyamide 6 (2) (PA6):
NOVAMIDE 1007J (registered trademark; produced by Mitsubishi Engineering-Plastics Corporation; relative viscosity: 2.2)

Modified polyphenylene ether-based resin (PPE):
UPIACE PME50 (registered trademark; produced by Mitsubishi Engineering-Plastics Corporation; rubber-containing acid-modified PPE)

Polystyrene (PS):
HH-102-305 (produced by A & M Styrene Co., Ltd.)

High-impact polystyrene (HIPS):
HT744 (produced by A & M Styrene Co., Ltd.; rubber-containing PS)

Polystyrene (m-PS)
DYELARK D232 (Nova Chemicals Co., Ltd.; acid-modified PS)

Polybutylene terephthalate (PBT):
NOVADURAN 5008 (registered trademark; produced by Mitsubishi Engineering-Plastics Corporation; intrinsic viscosity: 0.85)

Phosphazene compound:
Cyclic and chain phenoxy phosphazene compounds obtained in Synthesis Examples 1 to 4

Glass fiber
ECS03T-249 GH (produced by Nippon Denki Glass Co., Ltd.)

Zinc borate:
zB2335 (produced by Borax Co., Ltd.)

Magnetic powder:
Barium-ferrite magnetic powder having an average particle size of 2 μm

Examples 1 to 6 and Comparative Examples 1 to 7

Components shown in Tables 1 and 2 were weighed and mixed together at mixing ratios as shown. The resultant mixture was melt-kneaded at a cylinder temperature of 270° C. using a twin-screw extruder ("TEX30HCT" manufactured by Nippon Seikosho Co., Ltd.), thereby producing resin pellets. The thus obtained pellets were dried under reduced pressure at 120° C. for 8 hours, and then injection-molded at a cylinder temperature of 270° using an injection-molding machine ("J75ED" manufactured by Nippon Seikosho Co., Ltd.), thereby producing test specimens. The thus obtained pellets and test specimens were tested to evaluate the following test items (1) to (3). The results are shown in Tables 1 and 2.

(1) Evaluation of Bleed-Out of Flame Retarder and Mold Deposits:

The obtained dry pellets were examined by hand feeling and observed visually. Further, the mold after injection-molding was visually observed to determine whether or not any flame retarder was adhered to the surface thereof. The evaluation results were classified into the following two ranks:

Poor: Bleed-out and mold deposits were observed,
Good: No bleed-out and mold deposits were observed.

(2) Flammability Test According to UL94:
The 1/16"- and 1/32"-thick test specimens were subjected to a vertical flame test according to "Test of Flammability of Plastic Materials for Parts in Device and Appliances UL-94, Fourth Edition". The flammability test results were classified into the ranks "HB", "V-2", "V-1" and "V-0" according to the evaluation criteria of UL94.

(3) Flexural Strength and Flexural Modulus:
The flexural strength and flexural modulus were measured according to ASTI D790.

TABLE 1

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Composition (wt. part[1]) | | | | | | | | |
| PA6 | 100 | 100 | 100 | 100 | 100 | 100 | 100 | 100 |
| PBT | — | — | — | — | — | — | — | — |
| PPE | 67% | 67% | 67% | 67% | 67% | 67% | — | — |
| PS | — | — | — | — | — | — | 64% | — |
| HIPS | — | — | — | — | — | — | — | 64% |
| m-PS | — | — | — | — | — | — | 16% | 16% |
| Zinc borate | — | — | — | — | 50 | 80 | 90 | 90 |
| Phosphazene compound (Synthesis Example 1) | 33 | — | — | — | 50 | 60 | 50 | 50 |
| Phosphazene compound (Synthesis Example 2) | — | 33 | — | — | — | — | — | — |
| Phosphazene compound (Synthesis Example 3) | — | — | 33 | — | — | — | — | — |

TABLE 1-continued

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Phosphazene compound (Synthesis Example 4) | — | — | — | 33 | — | — | — | — |
| Glass fiber | 67 | 67 | 67 | 67 | 100 | 120 | 120 | 120 |
| Evaluation results | | | | | | | | |
| Bleed-out of flame retarder, and mold deposits[2] | Good | Good | Good | Good | Good | Good | Good | Good |
| UL94 test (1/16"-thick specimen) | V-2 | V-2 | V-2 | V-2 | V-0 | V-0 | V-2 | V-2 |
| UL94 test (1/32"-thick specimen) | Not measured | Not measured | Not measured | Not measured | V-1 | V-0 | Not measured | Not measured |
| Flexural strength (MPa) | 200 | 210 | 220 | 210 | 180 | 160 | Not measured | Not measured |
| Flexural modulus (GPa) | 8.2 | 8.0 | 8.1 | 8.2 | 8.8 | 9.2 | Not measured | Not measured |

Note:
[1] Amounts of PPE, PS, HIPS and m-PS were expressed by % by weight based on the weight of phosphazene compound; and
[2] Evaluation results of bleed-out of flame retarder and mold deposits are classified into the following ranks:
Good: No deposits and stickiness were observed on mold for mechanical test specimens, and molded product (flammability test specimens) and mold therefor. Poor: Considerable deposits and stickiness were observed thereon.

TABLE 2

|  | Com. Ex. 1 | Com. Ex. 2 | Com. Ex. 3 | Com. Ex. 4 | Com. Ex. 5 | Com. Ex. 6 |
|---|---|---|---|---|---|---|
| Composition (wt. part[1]) | | | | | | |
| PA6 | 100 | 100 | 100 | 100 | 100 | 100 |
| PBT | — | — | — | — | — | 67% |
| PPE | — | — | — | — | — | — |
| PS | — | — | — | — | — | — |
| HIPS | — | — | — | — | — | — |
| m-PS | — | — | — | — | — | — |
| Zinc borate | — | — | — | — | — | — |
| Phosphazene compound (Synthesis Example 1) | — | 27 | — | — | — | 33 |
| Phosphazene compound (Synthesis Example 2) | — | — | 27 | — | — | — |
| Phosphazene compound (Synthesis Example 3) | — | — | — | 27 | — | — |
| Phosphazene compound (Synthesis Example 4) | — | — | — | — | 27 | — |
| Glass fiber | 43 | 55 | 55 | 55 | 55 | 67 |
| Evaluation results | | | | | | |
| Bleed-out of flame retarder, and mold deposits[2] | Good | Poor | Poor | Poor | Poor | Poor |
| UL94 test (1/16"-thick specimen) | HB | V-2 | V-2 | V-2 | V-2 | V-2 |
| UL94 test (1/32"-thick specimen) | Not measured | Not measured | Not measured | Not measured | Not measured | Not measured |
| Flexural strength (MPa) | 250 | 230 | 210 | 220 | 220 | 230 |
| Flexural modulus (GPa) | 8.3 | 8.1 | 8.1 | 8.2 | 8.2 | 8.3 |

Note:
[1] Amount of PBT was expressed by % by weight based on the weight of phosphazene compound; and
[2] Evaluation results of bleed-out of flame retarder and mold deposits are classified into the following ranks:
Good: No deposits and stickiness were observed on mold for mechanical test specimens, and molded product (flammability test specimens) and mold therefor. Poor: Considerable deposits and stickiness were observed thereon.

From Tables 1 and 2, it was confirmed that:

(1) the flame retardant resin compositions of the present invention were free from bleed-out of phosphazene compound, zinc borate, etc., as flame retarders, as well as mold deposits, since the polyphenylene ether-based resin or the polystyrene-based resin having a good compatibility with the polyamide resin and phosphazene compound was blended in the resin composition (refer to Examples 1 to 6);

(2) on the contrary, the polyamide resin compositions obtained in Comparative Examples 1 to 5 where the polyamide resin solely was used as resin component, suffered from bleed-out of the phosphazene compound as flame retarder as well as mold deposits, and were, therefore, incapable of achieving the aimed object of the present invention (refer to Comparative Examples 1 to 5); and (3) the polyamide resin compositions obtained in Comparative Example 6 where PBT or PE having a poor compatibility with the polyamide resin and the phosphazene compound as flame retarder was blended, also suffered from bleed-out of the phosphazene compound as well as mold deposits, and were, therefore, incapable of achieving the aimed object of the present invention (refer to Comparative Examples 6 and 7).

Examples 9 to 14 and Comparative Examples 7 to 9

Components shown in Tables 3 and 4 were weighed and mixed together at mixing ratios as shown. The resultant mixture was melt-kneaded at a cylinder temperature of 270° C. using a twin-screw extruder ("TEX30HCT" manufactured by Nippon Seikosho Co., Ltd.), thereby producing resin pellets. The thus obtained pellets were dried under reduced pressure at 120° C. for 8 hours, and then injection-molded at a cylinder temperature of 270° C. and a mold temperature of 80° C. using an injection-molding machine ("J75ED" manufactured by Nippon Seikosho Co., Ltd.), thereby producing test specimens. The thus obtained pellets and test specimens were tested to evaluate the same test items (1) to (3) as described above. The results are shown in Tables 3 and 4.

TABLE 3

|  | Ex. 9 | Ex. 10 | Ex. 11 | Ex. 12 | Ex. 13 | Ex. 14 |
|---|---|---|---|---|---|---|
| Composition (wt. part[1]) | | | | | | |
| PA6 | 20.0 | 12.5 | 12.5 | 12.5 | 12.5 | 12.5 |
| PPE | 100% | 50% | 50% | 50% | 50% | 100% |
| Magnetic powder | 70.0 | 80.0 | 80.0 | 80.0 | 80.0 | 80.0 |
| Phosphazene compound (Synthesis Example 1) | 5.0 | 5.0 | — | — | — | — |
| Phosphazene compound (Synthesis Example 2) | — | — | 5.0 | — | — | — |
| Phosphazene compound (Synthesis Example 3) | — | — | — | 5.0 | — | — |
| Phosphazene compound (Synthesis Example 4) | — | — | — | — | 5.0 | 2.5 |
| Zinc borate | — | — | — | — | — | 2.5 |
| Evaluation results | | | | | | |
| Bleed-out of flame retarder, and mold deposits[2] | Good | Good | Good | Good | Good | Good |
| UL94 test (1/16"-thick specimen) | V-0 | V-0 | V-0 | V-0 | V-0 | V-0 |
| UL94 test (1/32"-thick specimen) | V-0 | V-0 | V-0 | V-0 | V-0 | V-1 |
| Flexural strength (MPa) | 100 | 80 | 80 | 80 | 80 | 110 |
| Flexural modulus (GPa) | 7 | 9 | 9 | 9 | 9 | 13 |

Note:
[1]Amount of PPE was expressed by % by weight based on the weight of phosphazene compound; and

TABLE 4

|  | Com. Ex. 7 | Com. Ex. 8 | Com. Ex. 9 |
|---|---|---|---|
| Composition (wt. part[1]) | | | |
| PA6 (2) | 30 | 20 | 15 |
| PPE | — | — | — |
| Magnetic powder | 70 | 80 | 80 |
| Zinc borate | — | — | — |
| Phosphazene compound (Synthesis Example 1) | — | — | 5 |
| Phosphazene compound (Synthesis Example 2) | — | — | — |
| Phosphazene compound (Synthesis Example 3) | — | — | — |
| Phosphazene compound (Synthesis Example 4) | — | — | — |
| Evaluation results | | | |
| Bleed-out of flame retarder, and mold deposits[2] | Good | Good | Poor |
| UL94 test (1/16"-thick specimen) | V-2 | Not acceptable | V-0 |
| UL94 test (1/32"-thick specimen) | V-2 | Not acceptable | V-0 |
| Flexural strength (MPa) | 110 | 120 | 100 |
| Flexural modulus (GPa) | 8 | 12 | 7 |

Note:
[1]Amount of PPE was expressed by % by weight based on the weight of phosphazene compound; and
[2]Evaluation results of bleed-out of flame retarder and mold deposits are classified into the following ranks: Good: No deposits and stickiness were observed on mold for mechanical test specimens, and molded product (flammability test specimens) and mold therefor. Poor: Considerable deposits and stickiness were observed thereon From Tables 3 and 4, it was confirmed that:

(1) the flame retardant resin magnet compositions of the present invention were free from bleed-out of phosphazene compound, zinc borate, etc., as flame retarders, and mold deposits, since the polyphenylene ether-based resin or the polystyrene-based resin having a good compatibility with the polyamide resin and phosphazene compound was blended in the resin compositions (refer to Examples 9 to 14);

(2) on the contrary, the polyamide resin compositions obtained in comparative Examples 7 and 8 where no flame retarder was used, were deteriorated in flame retardant property (refer to Comparative Examples 7 and 8); and (3) the polyamide resin composition obtained in Comparative Example 9 where the polyamide resin as a sole resin component was blended with the phosphazene compound as flame retarder, also suffered from bleed-out of the phosphazene compound as well as mold deposits end was, therefore, incapable of achieving the aimed object of the present invention (refer to Comparative Example 9).

What is claimed is:

1. A flame retardant resin composition comprising:

100 parts by weight of a thermoplastic polyamide resin (A), 1 to 100 parts by weight of a phosphazene compound (C), and a phosphazene compatibility enhancing resin (B), consisting essentially of a polyphenylene ether-based resin, or a mixture of a polyphenylene ether-based resin and a polystyrene based resin being present in an amount of 10 to 500% by weight based on the weight of said phosphazene compound (C); wherein the phosphazene compatibility enhancing resin (B) is present in an amount sufficient to prevent bleed-out of the phosphazene compound.

2. A flame retardant resin composition according to claim 1, wherein the phosphazene compound (C) comprises at least one compound selected from the group consisting of:

cyclic phenoxy phosphazenes represented by the general formula [I]:

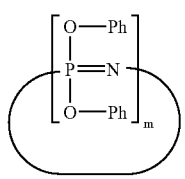

[I]

wherein m is an integer of 3 to 25 and Ph is phenyl;

chain phenoxy phosphazenes represented by the general formula [II]:

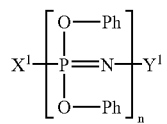

[II]

wherein $X^1$ is —N=P(OPh)$_3$ or —N=P(O)Oph, $Y^1$ is —P(OPh)$_4$ or —P(O)OPh$_2$, n is an integer of 3 to 10,000, and Ph is phenyl; and cross-linked phenoxy phosphazene compounds obtained by cross-linking at least one phenoxy phosphazene selected from the group consisting of those represented by the above general formulae [I] and [II] through a cross-linking group.

3. A flame retardant resin composition according to claim 2, wherein the cross-linking group is phenylene or bisphenylene.

4. A flame retardant resin composition according to claim 2, wherein the cross-linking group is at least one group selected from the group consisting of o-phenylene, m-phenylene, p-phenylene, and bisphenylenes represented by the general formula [III]:

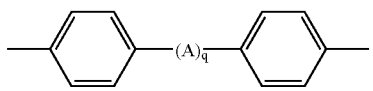

[III]

wherein A is —C(CH$_3$)$_2$—, —SO$_2$—. —S— or —O—; and q is 0 or 1.

5. A flame retardant resin composition according to claim 2, wherein said cross-linked phenoxy phosphazene compound comprises a cross-linking group which is present between two oxygen atoms of the phenoxy phosphazenes from which phenyl groups are eliminated; contains phenylene groups derived from those represented by the general formula [III] in an amount of 50 to 99.9 mol % based on the total number of phenyl groups and phenylene groups contained in the cyclic phenoxy phosphazene represented by the general formula [I], the chain phenoxy phosphazene represented by the general formula [II] or mixture thereof; and has no free hydroxy group in a molecule of the phosphazene compound (C).

6. A flame retardant resin composition according to claim 1, wherein the polyamide resin (A) is polyamide C.

7. A flame retardant resin composition according to claim 1, further comprising an inorganic filler (D1).

8. A flame retardant resin composition according to claim 7, wherein the inorganic filler (D1) is a glass fiber.

9. A flame retardant resin composition according to claim 7, wherein the content of the inorganic filler (D1) is 5 to 300 parts by weight based on 100 parts of the polyamide resin (A).

10. A flame retardant resin composition according to claim 1, further comprising a magnetic powder (D2).

11. A flame retardant resin composition according to claim 10, wherein the content of the magnetic powder (D2) is 50 to 95% by weight based on the weight of the flame retardant resin composition, and the content of the phosphazene compound (C) is 0.1 to 40% by weight based on the weight of the flame retardant resin composition.

12. A flame retardant resin composition according to claim 10, wherein the magnetic powder (D2) is ferrite-based magnetic powder, alnico-based magnetic powder or mixture thereof.

13. A flame retardant resin magnet comprising the flame retardant resin composition according to claim 10.

14. A flame retardant resin composition comprising:
100 parts by weight of a thermoplastic polyamide resin (A),
1 to 100 parts by weight of a phosphazene compound (C), and
an anti-bleedout resin (B) comprising a polyphenylene ether-based resin, a polystyrene-based resin or mixture thereof, the anti-bleedout resin being present in an amount of 10 to 500% by weight based on the weight of said phosphazene compound (C), and the anti-bleedout resin (B) is present in an amount sufficient to prevent bleed-out of the phosphazene compound,
resin pellets comprising said flame retardant resin composition being producible by extruding of said flame retardant resin composition by using a twin-screw extruder at 270° C. without bleed-out of phosphazene compound (C).

15. A flame retardant resin composition comprising:
100 parts by weight of a thermoplastic polyamide resin (A),
1 to 100 parts by weight of a phosphazene compound (C), and
a phosphazene compatibility enhancing resin (B), consisting essentially of a polyphenylene ether-based resin, or a mixture of a polyphenylene ether-based resin and a polystyrene based resin being present in an amount of 10 to 500% by weight based on the weight of said phosphazene compound C, and the phosphazene compatibility enhancing resin (B) is present in an amount sufficient to prevent bleed-out of the phosphazene compound,
further comprising an inorganic filler (D1),
wherein the inorganic filler (D1) is a glass fiber, and
wherein the glass fiber is surface-treated with a silane-based coupling agent.

16. A flame retardant resin composition comprising:
100 parts by weight of a thermoplastic polyamide resin (A),
1 to 100 parts by weight of a phosphazene compound (C), and a phosphazene compatibility enhancing resin (B), consisting essentially of a polyphenylene ether-based resin, or a mixture of a polyphenylene ether-based resin and a polystyrene based resin being present in an amount of 10 to 500% by weight based on the weight of said phosphazene compound (C), and the phosphazene compatibility enhancing resin (B) is present in an amount sufficient to prevent bleed-out of the phosphazene compound, wherein, the polyphenylene ether-based resin (B) is modified with α,β-unsaturated carboxylic acid.

17. The flame retardant resin of claim 1, wherein the amount of phosphazene compatibility enhancing resin (B) is 30 to 300% by weight based on the weight of said phosphazene compound (C).

18. The flame retardant resin of claim 1, wherein the amount of phosphazene compatibility enhancing resin (B) is 50 to 200% by weight based on the weight of said phosphazene compound (C).

* * * * *